(12) United States Patent

Reddinger

(10) Patent No.: US 12,617,526 B2

(45) Date of Patent: May 5, 2026

(54) FAST RESPONSE ROTOR SYSTEM

(71) Applicant: U.S. Army DEVCOM, Army Research Laboratory, Adelphi, MD (US)

(72) Inventor: Jean-Paul Francis Reddinger, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/491,740

(22) Filed: Oct. 1, 2021

(65) Prior Publication Data

US 2023/0108395 A1    Apr. 6, 2023

(51) Int. Cl.
*B64C 27/39* (2006.01)
*B64C 27/51* (2006.01)
*B64C 27/57* (2006.01)

(52) U.S. Cl.
CPC .............. *B64C 27/39* (2013.01); *B64C 27/51* (2013.01); *B64C 27/57* (2013.01)

(58) Field of Classification Search
CPC .................................................... B64C 27/39
See application file for complete search history.

(56) References Cited

U.S. PATENT DOCUMENTS 9,914,535 B2 *    3/2018    Paulos .................... B64C 27/48

FOREIGN PATENT DOCUMENTS

| CN | 105947194 A | * | 9/2016 | |
| CN | 111776208 A | * | 10/2020 | ............. B64C 27/06 |
| CN | 212243791 U | * | 12/2020 | |

OTHER PUBLICATIONS

Paulos, et al., Cyclic Blade Pitch Control Without a Swashplate for Small Helicopters, Journal of Guidance, Control, and Dynamics, vol. 41, No. 3, Mar. 2018, pp. 689-700.
Paulos, et al., Scalability of Cyclic Control Without Blade Pitch Actuators, American Institute of Aeronautics and Astronautics, pp. 1-15.
Walter, et al., An Assessment of Heave Response Dynamics for Electrically Driven Rotors of Increasing Diameter, Presented at the 2019 Autonomous VTOL Technical Meeting and eVTOL Symposium, Mesa, AZ, Jan. 29-31, 2019, pp. 1-8.

* cited by examiner

*Primary Examiner* — Courtney D Heinle
*Assistant Examiner* — John S Hunter, Jr.
(74) *Attorney, Agent, or Firm* — Alan I. Kalb

(57) ABSTRACT
A rotor system comprising a hinge coupled between a rotor blade and a hub, where the hinge comprises a pivot that is angled relative to a rotor axis of rotation to enable pitch of the rotor blade to change when the rotor blade experiences lag. The angle of the pivot controls an amount of pitch that results in response to an amount of lag.

1 Claim, 4 Drawing Sheets

| Parameter | Value | | | |
|---|---|---|---|---|
| $d$ | 40" | 40" | 50" | 50" |
| $\beta_{hinge}$ | rigid | 60° | rigid | 60° |
| $x_{hinge}$ | rigid | 0.35c | rigid | 0.35c |
| $\theta_{75}$ | 12.2° | 4.8° | 12.2° | 7.8° |
| $t = 0$ | | | | |
| thrust (lbs) | 52.8 | 52.8 | 82.1 | 82.1 |
| RPM | 3000 | 3000 | 2400 | 2400 |
| torque (ft-lbs) | 7.0 | 7.0 | 13.6 | 13.6 |
| power (hp) | 4.0 | 4.0 | 6.2 | 6.2 |
| $t \to \infty$ | | | | |
| thrust (lbs) | 133.1 | 140.9 | 181.9 | 193.8 |
| RPM | 4678 | 4620 | 3510 | 3402 |
| torque (ft-lbs) | 21.3 | 24.7 | 33.9 | 40.8 |
| power (hp) | 18.9 | 21.7 | 22.6 | 26.4 |
| $\tau_{thrust}$ (ms) | 34 | 31 | 88 | 60 |
| $\tau_{RPM}$ (ms) | 33 | 51 | 82 | 79 |

TABLE 1

FAST RESPONSE ROTOR SYSTEM

GOVERNMENT INTEREST

The invention described herein may be manufactured, used and licensed by or for the U.S. Government.

BACKGROUND

Field

Embodiments of the present invention generally relate to rotor systems and, more specifically, to a rotor system for an electric motor having fast response.

Description of the Related Art

Vertical take-off and landing (VTOL) aircraft, such as drones, that utilize electric motors have entered widespread use. Such aircraft are used, for example, as air taxis and delivery services. To operate economically, the aircraft are required to be light weight and very agile. As such, the electric motors that power the aircraft are small and light weight, yet need to produce a substantial amount of power. Typically, each motor directly drives a fixed pitch rotor comprising multiple blades mounted to a motor hub. In a fixed pitch rotor system, the thrust generated by the rotor is controlled by the revolutions per minute (RPM) rotor-motor combination.

For large scale RPM controlled rotors, the inertia of the blades prevents the motor from speeding up or slowing down rapidly. This causes multi-rotor aircraft using electric propulsion to fly "sluggishly" (i.e., with poor handling qualities).

In addition, an electric motor produces back electromagnetic force (EMF) as the motor rotates. This back EMF produces a drag on the motor such that the greater the back EMF, the larger the motor power requirement, i.e., the back EMF reduces motor torque at high rotational speeds. Also, the faster the motor rotates, the greater the back EMF that is generated.

Therefore, there is a need in the art for a rotor system that reduces back EMF such that, for a given electric motor, more thrust is generated at a specified RPM.

SUMMARY

Embodiments of the present invention include a rotor system comprising a pitch-lag coupled hinge located between a motor hub and blades of a rotor in accordance with the following description and drawings.

BRIEF DESCRIPTION OF THE DRAWINGS

So that the manner in which the above recited embodiment of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include a rotor system comprising a pitch-lag hinge coupled between a root end of a propellor blade and a hub. Use of the pitch lag hinge enables a given motor to produce higher thrust in less time when compared to the same rotor system without the pitch-lag hinge. The hinge is passive and automatically alters the pitch of a blade in response to rotor lag.

Embodiments of the pitch-lag hinge coupled rotor system find use in vertical take-off and landing (VTOL) aircraft and, especially in electric VTOL (eVTOL) aircraft. In an eVTOL application, the hub is rotated by an electric motor and the hinge provides a change in pitch to offset back EMF effects.

Figures 1, 1A:
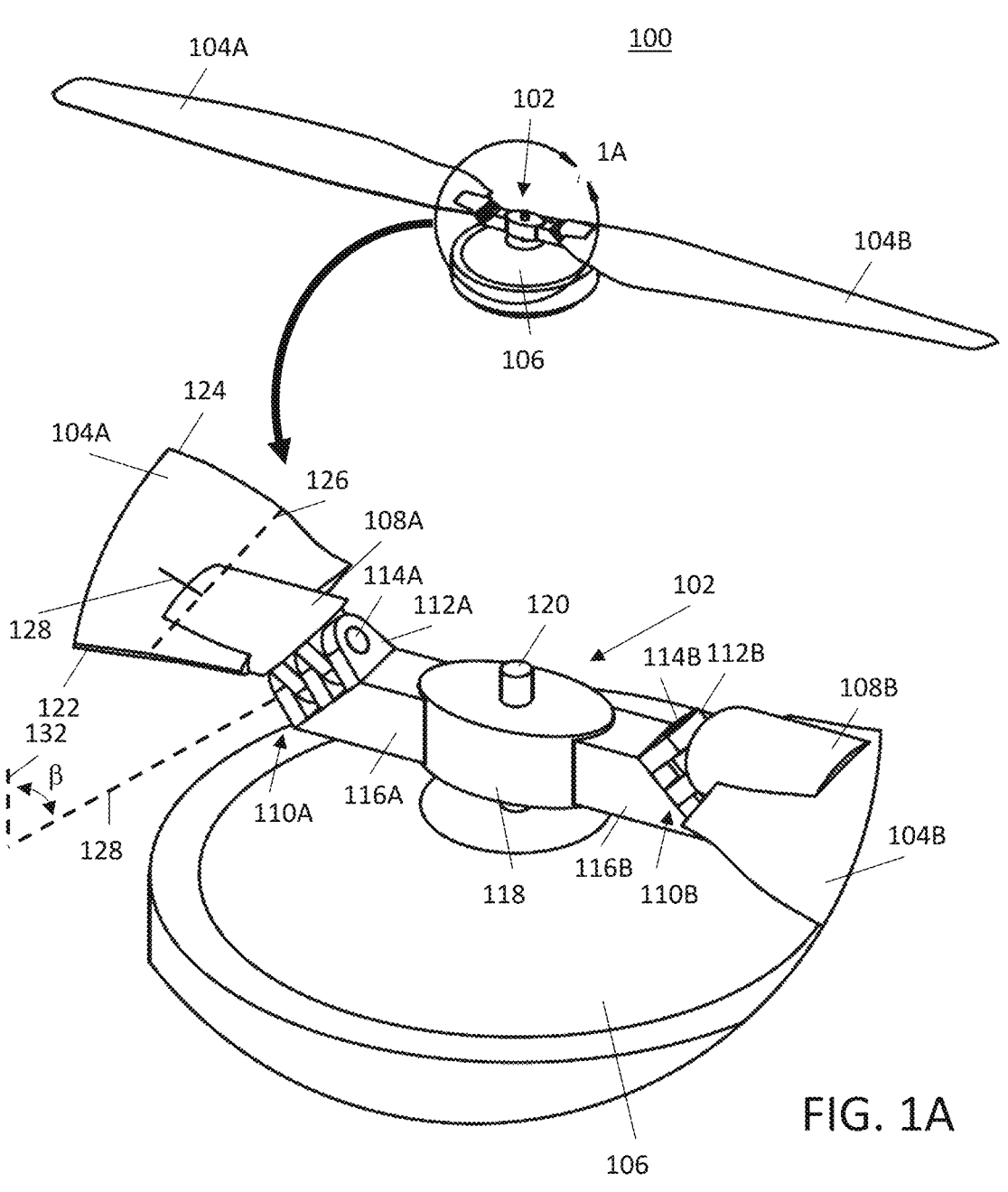
FIG. 1 depicts a perspective view of a rotor system in accordance with at least one embodiment of the present invention.
FIG. 1A depicts a detailed view of the rotor system along line 1A in FIG. 1.

FIG. 1 depicts a perspective view of a rotor system 100 in accordance with an embodiment of the present invention, where the rotor system comprises a pitch-lag hinge 102 coupled between each propellor blade 104A and 104B and an electric motor hub 106. FIG. 1A depicts a detailed view of the pitch-lag hinge 102 in accordance with at least one embodiment of the invention. The hinge 102 comprises a center portion 118 that is coupled to a shaft 120 of the motor hub 106. An electric motor (not shown) is housed inside the hub 106 and, typically, directly drives the shaft 120 to impart rotational torque to the center portion 118.

The center portion 118 is connected to a proximal end of an arm 116A and 116B— one arm for each blade 104A and 104B. The length of each arm 116A and 116B establishes an outboard distance of each blade 104A and 104B from the center portion 118. A distal end of each arm ends in a set of flanges 112A and 112B. The flanges 112A and 112B are respectively interspersed with flanges 110A and 110B that couple to a blade coupler 108A and 108B (e.g., a clamp). Flanges 110A and 112A are rotatably coupled via pin 114A. Similarly, flanges 110B and 112B are rotatably coupled via pin 114B. Each blade coupler 108A/108B is attached to its respective blade 104A/104B.

The flanges 110A, 110B, 112A, 112B and the pins 114A, 114B form the active portion of the pitch lag hinge 102 (i.e., the pin forms a pivot around which the flanges 110A/110B rotate and move with respect to flanges 112A/112B). In the depicted embodiment, there are flanges 112A/112B comprise three flanges with flanges 110A/110B having two flanges interspersed between the flanges of 112A/112B. In other embodiments, other numbers of flanges may be used and/or other structures of hinges may be used. Each pin 114A/114B is arranged at an angle to the vertical axis (axis of rotor rotation). This angle is referred to as the hinge angle. The location of attachment of the blade couplers to the blades is measured along the blade chord and is referred to as the chordwise hinge location. As shall be described in detail below, the chordwise hinge location (i.e., the attachment point of the couplers 108A/108B to the blades 104A/104B along the blade chord) and the hinge angle are parameters that control the effectiveness of the pitch-lag hinge in improving the operation of the rotor system 100 over that of a conventional fixed pitch rotor system. In addition, the greater the outboard distance (i.e., the longer the arms 116A and 116B) the stiffer the lag dynamics will be (i.e., the harder it will be to rotate through the hinge in operation).

A chord 126 is a measure of width of a blade from leading edge 122 to trailing edge 124. Rotation of the rotor system in FIGS. 1 and 1A is counter-clockwise. The blade coupler is attached at a location along the chord that is a fractional distance along the chord 126. For example, a chordwise hinge location 128 of 0.25 means the blade coupler 108A is attached one-quarter of the length of the chord 126 from the leading edge 122. The hinge angle β is an angle of hinge axis 130 and the vertical axis 132 (parallel to the axis of rotor rotation). For example, if the hinge angle is 45 degrees, the pitch of the blade will increase one degree for every degree of lag. As shall be described in detail below, changes in the hinge angle and chordwise hinge location significantly change the amount of thrust and torque produced by a given rotor system.

Figure 2:
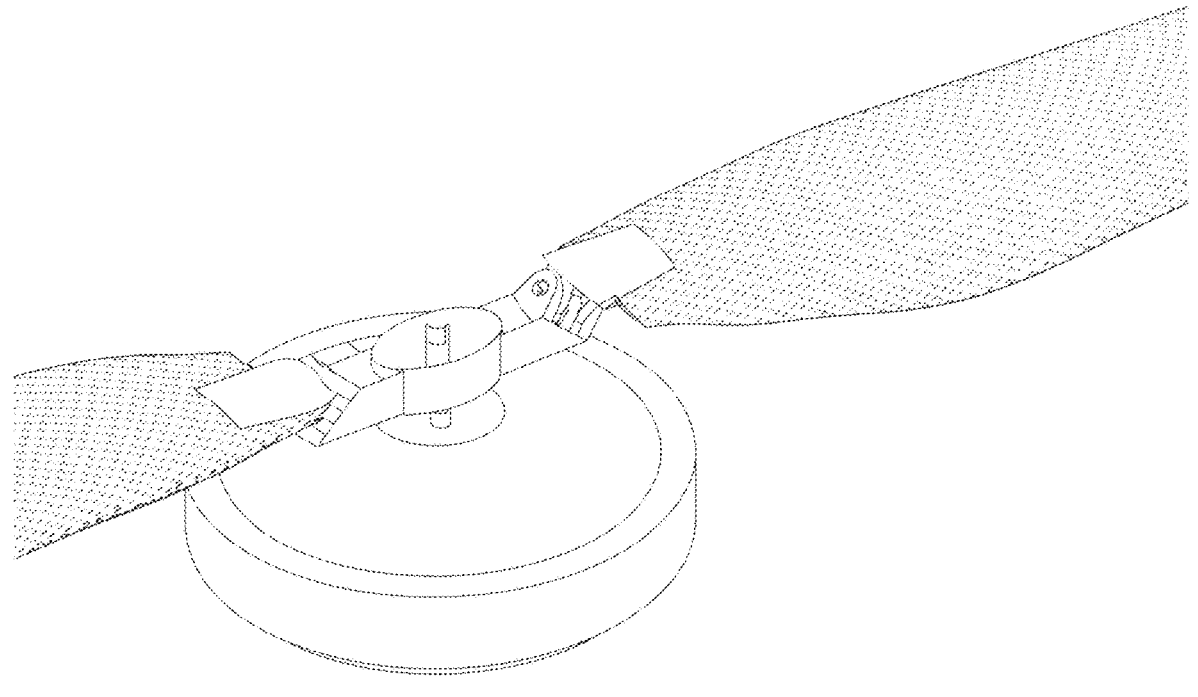
FIG. 2 depicts a model of a portion of the rotor system of FIG. 1 in accordance with at least one embodiment of the present invention.

FIG. 2 depicts a perspective image of a model of a portion of the rotor system 100 in FIGS. 1 and 1A.

The governing steady-state moment balance equations are:

$$\sin\frac{\beta_{hinge}}{2} \cdot M_\theta = \cos\frac{\beta_{hinge}}{2} \cdot M_\zeta \qquad (1)$$

where $\beta_{hinge}$ is the hinge angle, deg
$M_\theta$ is the blade pitchwise moment, ft-lbs
$M_\zeta$ is the blade lagwise moment, ft-lbs
The blade elemental moments are defined as:

$$M_\theta = q_r C_m c^2 dr + x_h q_r C_l cr \qquad (2)$$

$$M_\zeta = \sin \zeta m\Omega^2 r^2 dr + q_r C_d cr \qquad (3)$$

where
$q_r$ is the dynamic pressure at radial position, r, $$\frac{lbs}{ft^2}$$

$C_m$ is the airfoil coefficient of moment
c is the chord length, ft
r is the rotor radius, ft
$x_h$ is the hinge distance from the leading edge, ft
$C_l$ is the airfoil coefficient of lift
$\Omega$ is the rotor rotational speed, rad/s
$C_d$ is the airfoil coefficient of drag
$\zeta$ is the lag angle of the blade, deg
m is the sectional mass of the blade, slug/ft
From Equations 1, 2, and 3, it is evident that behavior of the pitch-lag hinge rotor system 100 is dependent upon the hinge angle β and hinge distance $x_h$.

Figure 3:
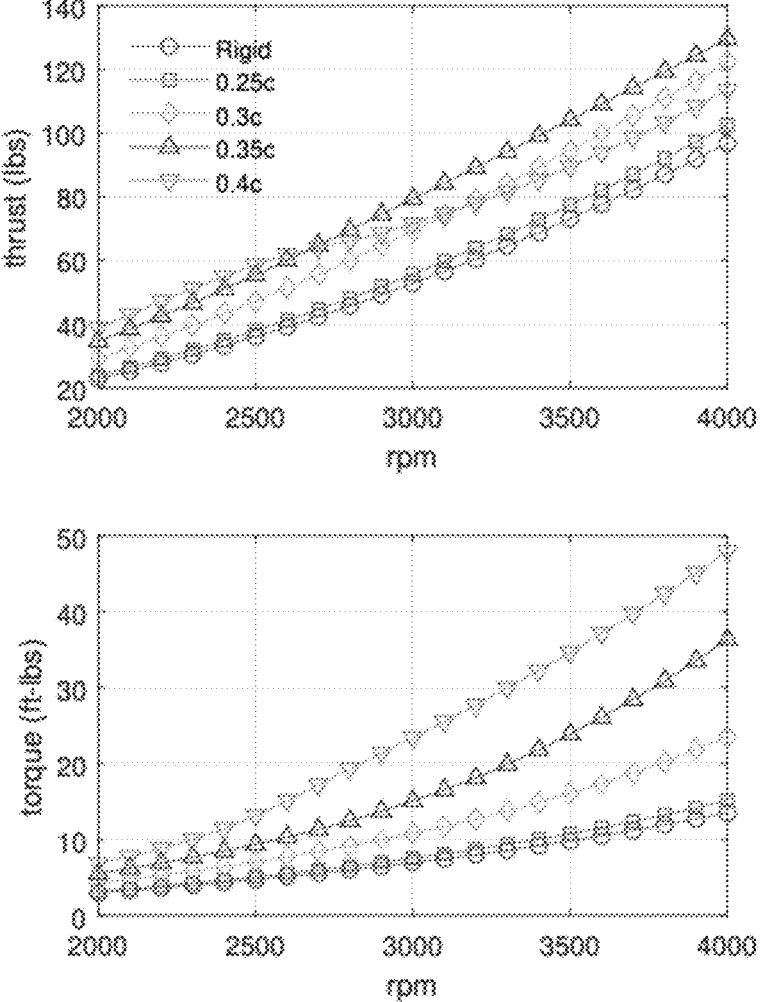
FIG. 3 depicts a graph of thrust and torque for various chordwise locations for a pitch-lag hinge in accordance with an embodiment of the present invention; and Table 1 depicts test results for various rotor systems when a step voltage is applied to the rotor systems.

The rotor system torque and thrust were modeled using a hinge angle of 45 degrees and a spanwise hinge location of 0.096 of the radius of a blade (measured from the hub axis of rotation to the blade tip), then varying the chordwise hinge location from 0.25c to 0.4c. Although the model was limited to a range of 0.25c to 0.4c, other locations may be used. The lower limit results in diminished effectiveness if the location is too far ahead of the aerodynamic center at 0.25c, and the upper limit results in blade stall and loss of control at a location that is subject to blade design and operating conditions. The modelling was performed using a 40 inch diameter rotor. FIG. 3 depicts graphs of RPM vs. thrust and RPM vs. torque for various chordwise locations as well as for a rigid rotor. The chordwise hinge location is shown to significantly impact the thrust and torque produced at all RPM levels. For all RPM levels, the hinged rotor system provides more torque and thrust when compared to an unhinged (rigid) rotor system.

When the hinge is aligned with a quarter chord (i.e., 0.25c), the lift generated by the blade does not produce a moment about the hinge. In this case, only the aerodynamic moment, drag and centrifugal force affect the hinge rotation. Relative to the rigid rotor, this coupling results in an increase in thrust and torque at all rotor speeds.

As the hinge location moves further aft along the airfoil, the moment generated by the aerodynamic lift on the blade contributes to a larger moment about the hinge, resulting in a larger steady state rotation angle. As such, the pitch and lag rotations for a hinge located at 0.4c varies from 7 to 10 degrees, relative to the <1 degree of rotation for the 0.25c hinge location.

Of note, the increased inflow of the rigid rotor tends to produce a reduction in angle of attack as rotor speed increases. The hinge overcomes the increase in inflow with a larger pitch angle, resulting in a net increase in angle of attack with increases in rotor speed.

In one comparative example, a rigid rotor operating at 3000 RPM produces 52.8 lbs of thrust using a 4.0 horsepower motor generating 7 ft-lbs of torque. A hinged rotor system with a 45 degree hinge angle and a 0.3c coupling location produces the same thrust at 2634 RPM, for 8.0 ft-lbs of torque and an identical 4.0 horse power motor. The increased torque is offset by the 12.2% reduction in RPM such that the dimensional power loading is constant in the two cases. The primary effect of the pitch-lag coupled hinge is trim at an increased torque and a reduced rotor speed without affecting the power requirement.

Hinge angle also plays a role in the effectiveness of the pitch-lag hinge rotor system. A hinge angle of zero degrees is equivalent to a pure lag hinge, while a hinge angle of 75 degrees produces approximately 3.5 degrees of pitch for each degree of lag. For all rotor speeds, the thrust, torque and power requirements of the pure lag hinge is within 0.1% of the rigid rotor performance. The pure lag hinge and the rigid rotor are functionally equivalent in steady state.

At low hinge angles of zero to 45 degrees, the large lag angles couple through to a relatively low pitch angle. With increased rotor speed, the increased aerodynamic drag results in a larger lag deflection angle. Since the pitch coupling is low, most of the pitch moment passes through to the hub rather than acting to rotate the hinge.

At higher hinge angles of 45 to 60 degrees, the pitch angle is greater than the lag angle, and the aerodynamic lift on the blade dominates to provide a greater sensitivity of hinge angle rotation to rotor speed. Beyond 75 degrees, the steady state angles begin to reduce, while the sensitivity to rotor speed continues to increase. The maximum increase in thrust and power coefficients coincides with the maximum deflection angles of the 60 degree hinge angle.

The observed effect of variation in hinge angle is similar to that of chordwise hinge location, in that, it provides a way to modify sensitivity of thrust and power to variation in rotor speed. As with hinge location, the changes that hinge angle produces does not adversely affect the power requirement when trimmed to a constant thrust. The extent of torque and rotor speed change is maximized around 60 degrees.

Scalability has been confirmed through repeating performance testing on a 50 inch diameter rotor. The 50 inch rotor performed similarly to the 40 inch rotor wherein using a pith-lag hinge improved thrust and torque. In addition, varying chordwise hinge location and hinge angle for the 50 inch rotor had similar results in changing the rotor system performance as was seen for the 40 inch rotor.

To measure dynamic response of the rotor systems, the 40 inch and 50 inch rotor systems (rigid and hinged) were modeled at a steady state where an input voltage was provided to the systems to trim to 3000 RPM for the 40 inch rotors and 2400 RPM for the 50 inch rotors. The rotor-motor dynamics were simulated for 2 seconds to measure the response to a step in input voltage. After about 0.6 seconds from the voltage step, all the rotors settled on a new steady state. The new steady state values are shown in Table 1.

The 40 inch rigid rotor requires 34 ms to reach maximum thrust after the voltage step is applied. While the 40 inch hinged rotor (60 degree hinge angle) requires 31 ms to reach maximum thrust. Similarly, the 50 inch rigid rotor required 88 seconds to reach maximum thrust, while the 50 inch hinged rotor required only 60 seconds. The back EMF effect slows the response time of the rigid rotor system.

For the pitch lag hinged rotors, the voltage step initially causes a lag response which quickly increases rotor pitch and its thrust production. Consequently, once steady state is achieved, the hinged rotors have a lower rotor speed and higher thrust for the same input voltage compared to the rigid rotors. In addition, at higher rotor speeds where back EMF effects impact performance of a rigid blade rotor system, the pitch-lag hinge coupled rotor system overcomes the back EMF effects and provides increased thrust and torque.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A rotor system for a vertical take-off and landing (VTOL) aircraft, comprising:
a hub configured to be rotated by an electric motor housed within the hub, the hub comprising a rotatable shaft defining a vertical axis of rotation;
at least one rotor blade, each rotor blade having a root end and a chord extending from a leading edge to a trailing edge, the chord defining a chord length;
a pitch-lag hinge assembly mechanically coupled between the root end of the rotor blade and the shaft of the hub, the hinge assembly comprising:
a center portion rigidly connected to the shaft of the hub to rotate therewith;
an arm having a proximal end fixed to the center portion and a distal end extending radially outward from the vertical axis of rotation, the arm defining an outboard distance from the hub to the blade;
a first set of flanges rigidly affixed to the distal end of said arm;
a blade coupler mechanically affixed to the root end of said rotor blade at a chordwise hinge location between 0.25 and 0.4 of the chord length, measured from the leading edge of the rotor blade;
a second set of flanges rigidly affixed to the blade coupler, said second set of flanges interdigitated with said first set of flanges; and
a hinge pin extending through said interdigitated first and second sets of flanges to define a pivot axis of the hinge, wherein the pivot axis is inclined relative to the vertical axis of rotation by a hinge angle in the range of 0 to 75 degrees;
wherein said hinge pin permits rotation of the rotor blade about the pivot axis such that lagwise deflection of the rotor blade during operation induces a passive change in blade pitch, the amount of pitch change being proportional to the hinge angle and the lag angle of the rotor blade;
wherein said arrangement of the hinge assembly provides coupling between pitch and lag motions, such that increased lag due to aerodynamic drag or dynamic loading results in an automatic increase in blade pitch, thereby enhancing thrust generation and reducing the time required to reach maximum thrust in response to changes in motor input;
and wherein said length of the arm affects the stiffness of the lag response, with a longer arm increasing resistance to lag-induced motion about the hinge axis.

* * * * *